United States Patent [19]
Sato et al.

[11] Patent Number: 6,088,597
[45] Date of Patent: *Jul. 11, 2000

[54] DEVICE AND METHOD FOR CONTROLLING SPEECH-PATH

[75] Inventors: Teruhisa Sato; Takaaki Kawakami, both of Kawasaki, Japan

[73] Assignee: Fujtisu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/770,910

[22] Filed: Dec. 20, 1996

Related U.S. Application Data

[63] Continuation of application No. 08/193,695, Feb. 8, 1994, abandoned.

[30] Foreign Application Priority Data

Feb. 8, 1993 [JP] Japan .................................... 5-020057
Jan. 24, 1994 [JP] Japan .................................... 6-005965

[51] Int. Cl.$^7$ ...................................................... H04Q 7/30
[52] U.S. Cl. .......................... 455/560; 455/445; 455/422; 370/360
[58] Field of Search ..................................... 455/445, 560, 455/561, 524, 422; 370/249, 351, 360, 357; 379/242, 248, 258, 270, 306

[56] References Cited

U.S. PATENT DOCUMENTS

| | | | |
|---|---|---|---|
| 4,879,712 | 11/1989 | Littlewood | 370/218 |
| 4,926,421 | 5/1990 | Kawano et al. | 379/60 X |
| 5,432,783 | 7/1995 | Ahmed et al. | 370/351 |

OTHER PUBLICATIONS

"ATM Technology for Corporate Networks", IEEE Communications Magazine, Apr. 1992, p. 90–100.

*Primary Examiner*—William G. Trost
*Attorney, Agent, or Firm*—Helfgott & Karas, P.C.

[57] ABSTRACT

In a speech-path controlling method and device for a speech-path switch of a switching network, for establishing a speech-path between an input port connected to a subscriber's line and an output port connected to a trunk, an output re-circling line is provided connecting a specific output port to the input port of the switch. To connect the subscriber's line to the trunk, a speech-path is established between the input port connected to the subscriber's line and the output port connected to the output re-circling line, and a speech-path is established between the output port connected to the trunk and the input port connected to the output re-circling line.

14 Claims, 15 Drawing Sheets

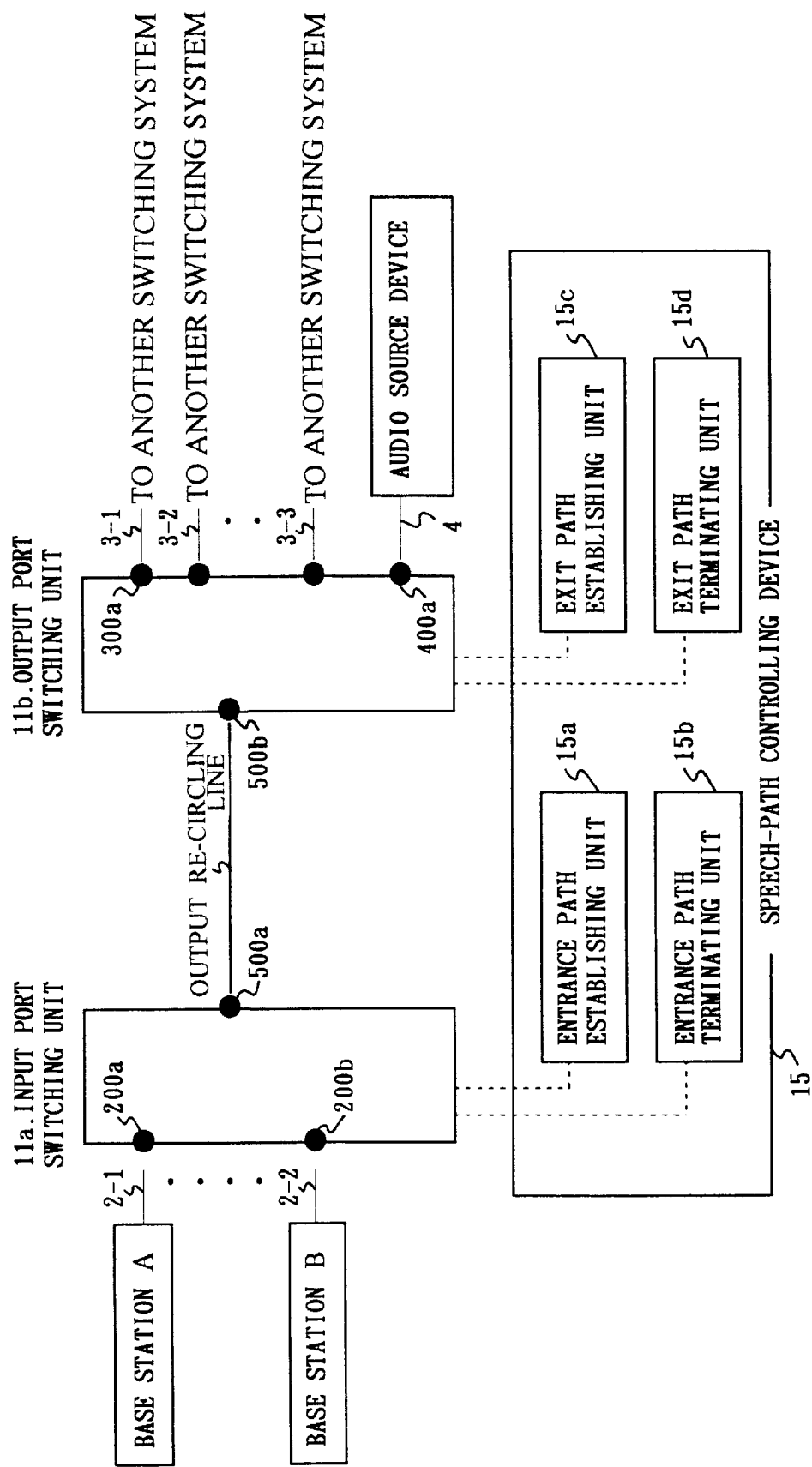
F I G. 7

6,088,597

DEVICE AND METHOD FOR CONTROLLING SPEECH-PATH

This is a continuation, of application Ser. No. 08/193,695, filed Feb. 8, 1994, now abandoned.

BACKGROUND OF THE INVENTION (1) Field of the Invention

This invention relates to a speech-path switch for establishing and terminating connection between a subscriber's line and a trunk in a switching system of a mobile communication device.

(2) Description of the Related Art

A switching system has speech-path switches for establishing and terminating connection between subscriber's lines and trunks.

The speech-path switch comprises a plurality of input and output ports.

Each input port is connected to one end of a subscriber's line. The other end of the subscriber's line is connected to a terminal of a subscriber. On the other hand, each output port is connected to one end of a trunk. The other end of the trunk is connected to another switching system. The output port is also connected to one end of a transmitting and receiving line. The other end of the transmitting and receiving line is connected to a communication servicing device. The communication servicing device provides communication services to the associated terminals. Such services include call waiting which allows breaking into a call temporarily to leave a quick voice message to a terminal.

On receiving a call establishment request signal from another terminal, the switching system determines a switching network in which a called or destination terminal is contained. The switching system also determines the output port of the trunk connected to the destination switching system in the switch network.

The switching system examines the speech-path switch and the available paths to which the call is routed, determines and which of these is free. The switching system sets up a speech-path between the input port of the subscriber's line to be connected to the terminal and the output port of the trunk to be connected to the calling switch.

On receiving a communication service request from the terminal in communication, the switching system determines which communication service is requested by the terminal. In addition, the switching system also determines the associated communication servicing device and the output port of the transmitting and receiving line connected thereto. The switching system terminates the connection between the input port of the subscriber's line and the output port of the trunk. At the same time, the switching system establishes the connection between the input port of the subscriber's line and the output port of the transmitting and receiving line.

A communication network may sometimes contain a mobile device that transmits and receives data using radio waves. Such communication network is provided with a plurality of base stations between the switching systems and the mobile device. The base station transmits and receives data using radio waves to and from the mobile device in a specific area. In addition, the base station transmits and receives data using wires including the subscriber's lines to and from switching systems.

For example, a base station covering a specific zone A transmits, when receiving a call establishment request from a mobile device located within the specific zone A, a call establishment request signal to the switching system through the subscriber's line.

In response to the call establishment request signal, the switching system determines the input port of the subscriber's line connected to the base station A. The switching system determines a switching system covering the called mobile device as well as the output port of the trunk connected to the destination switching system.

Subsequently, the switching system finds available paths in the speech-path switch and establishes a speech-path between the input port and the output port. In addition, the switching system transmits the call establishment request signal to the called switching system through the speech-path and the trunk.

When the mobile device in communication moves out of the specific zone A to a specific zone B, a base station B covering the specific zone B notifies the switching system of the movement of the mobile device.

In response to the notification of the movement of the mobile device, the switching system terminates the speech-path established before the movement. Subsequently, the switching system finds available paths in the speech-path switch and establishes a fresh speech-path between the input port of the subscriber's line connected to the station B and the output port of the trunk.

In addition, on receiving a request for the communication service from the mobile device, the switching system terminates the path established between the input port of the subscriber and the output port of the trunk. The switching system determines the communication servicing device corresponding to the communication service in question. At the same time, the switching system determines the output port of the transmitting and receiving line connected to the destined communication servicing device. The switching system confirms the busy states of the paths in the speech-path switch, and also confirms which of these is free. The switching system then establishes the speech-path between the input port of the subscriber's line and the output port of the transmitting and receiving line.

A method of switching speech-paths is now described in detail.

An audio source is described here as an example of the communication servicing device. The audio source is a device for transmitting a voice message to the mobile device.

Before setting up communication, a user of the mobile device located in the specific zone A sends an off-hook signal and calls a called number of the destination telephone terminal.

In response to the off-hook signal and the called number, the base station covering the specific zone A sends these signals to the switching system of the mobile device.

The switching system analyzes the called number to determine the switching network in which the called telephone terminal is contained. The switching system traps the trunk connected to the switching system in the destined switching network.

The speech-path switch establishes a first speech-path between the input port connected to the subscriber's line and the output port connected to the trunk. At this time, the mobile device and the destination telephone terminal are in a communication state.

If the called telephone terminal receives an interruption call in the communication between the mobile device, the mobile device is in the call waiting (to wait until termination of the other call). In this event, the speech-path switch establishes a second speech-path between the line connected to the audio source and the subscriber's line.

If the mobile device in communication or in call waiting moves out of the specific zone A to the specific zone B, the base station covering the specific zone B notifies the switching system of the movement of the mobile device.

In response to the notification of the movement of the mobile device, the switching system terminates the first speech-path and, at the same time, establishes a third speech-path between the subscriber's line connected to the base station covering the specific zone B and the trunk or between the subscriber's line connected to the base station covering the specific zone B and the transmitting and receiving line connected to the audio source.

Upon termination of the interrupting speech of the called telephone terminal, the speech-path switch re-establishes the first speech-path between the subscriber's line of the mobile device and the trunk.

A position of the subscriber's line, i.e., a position of the input port of the speech-path switch is not fixed in the communication network in which the mobile device is contained. Accordingly, the switching system is required to establish the speech-path in consideration of both, the input port and the output port.

More specifically, the switching system is required to switch the output port for providing the communication service as well as to switch the input port due to movement of the mobile device. Switching of these speech-paths for the different purposed is carried out in the single speech-path switch. As a result, it is necessary to take the servicing state along with the state of the mobile device into account, which complicate the processing in the switching system.

SUMMARY OF THE INVENTION

It is an object of the present invention to provide a method and a device for controlling a speech-path switch for use in establishing and terminating a speech-path connecting a subscriber's line and a trunk in a communication network containing a mobile device. The present invention is directed to a speech-path switch comprising input ports to be connected to a subscriber's line and output ports to be connected to a trunk, wherein output re-circling line is provided for supplying an output of a particular output port to a particular input port. In this event, the subscriber's line is considered to be connected to a base station that transmits and receives data to and from a mobile device using radio waves. The trunk is considered to be connected to other switching network.

A method and a device for controlling speech-paths according to the present invention is now described.

First, the speech-path controlling method comprises an entrance path establishing step and an exit path establishing step.

The entrance path establishing step is a procedure for establishing a speech-path between the input port to which the subscriber's line is connected and the output port to which the output re-circling line is connected.

The exit path establishing step is a procedure for establishing a speech-path between the output port to which the trunk is connected and the input port to which the output re-circling line is connected.

The speech-path established between the subscriber's line and the output re-circling line is herein referred to as a first speech-path and the speech-path established between the trunk and the output re-circling line is referred to as a second speech-path. The data is transferred through the following procedures:

(1) sending from the mobile device to the base station;

(2) transmission from the base station to the subscriber's line;

(3) transmission from the subscriber's line to the first speech-path through the input port;

(4) transmission from the first speech-path to the output re-circling line through the output port;

(5) transmission from the output re-circling line to the second speech-path through the input port; and (6) transmission from the second speech-path to the trunk through the output port.

Second, the speech-path controlling device is described.

The speech-path controlling device comprises entrance path establishing means and exit path establishing means.

The entrance path establishing means has a function to establish a speech-path between the input port connected to the subscriber's line and the output port connected to the output re-circling line.

The exit path establishing means has a function to establish a speech-path between the output port connected to the trunk and the input port connected to the output re-circling line.

According to the present invention, it is possible to carry out processing for switching the speech-paths as a result of movement of the mobile device independently of processing for switching the speech-path involving control of the services. This allows simplification of the speech-path control. In addition, simplification of the speech-path control reduces burden imposed on the control device and improves the processing speed.

These and other objects and features of the present invention will become more fully apparent from the following description and appended claims taken in conjunction with the accompanying drawing.

BRIEF DESCRIPTION OF THE DRAWINGS

FIG. 7 is a view showing a logical structure of a time switch according to the second embodiment;

DESCRIPTION OF THE PREFERRED EMBODIMENTS

Embodiment 1

Figure 1:
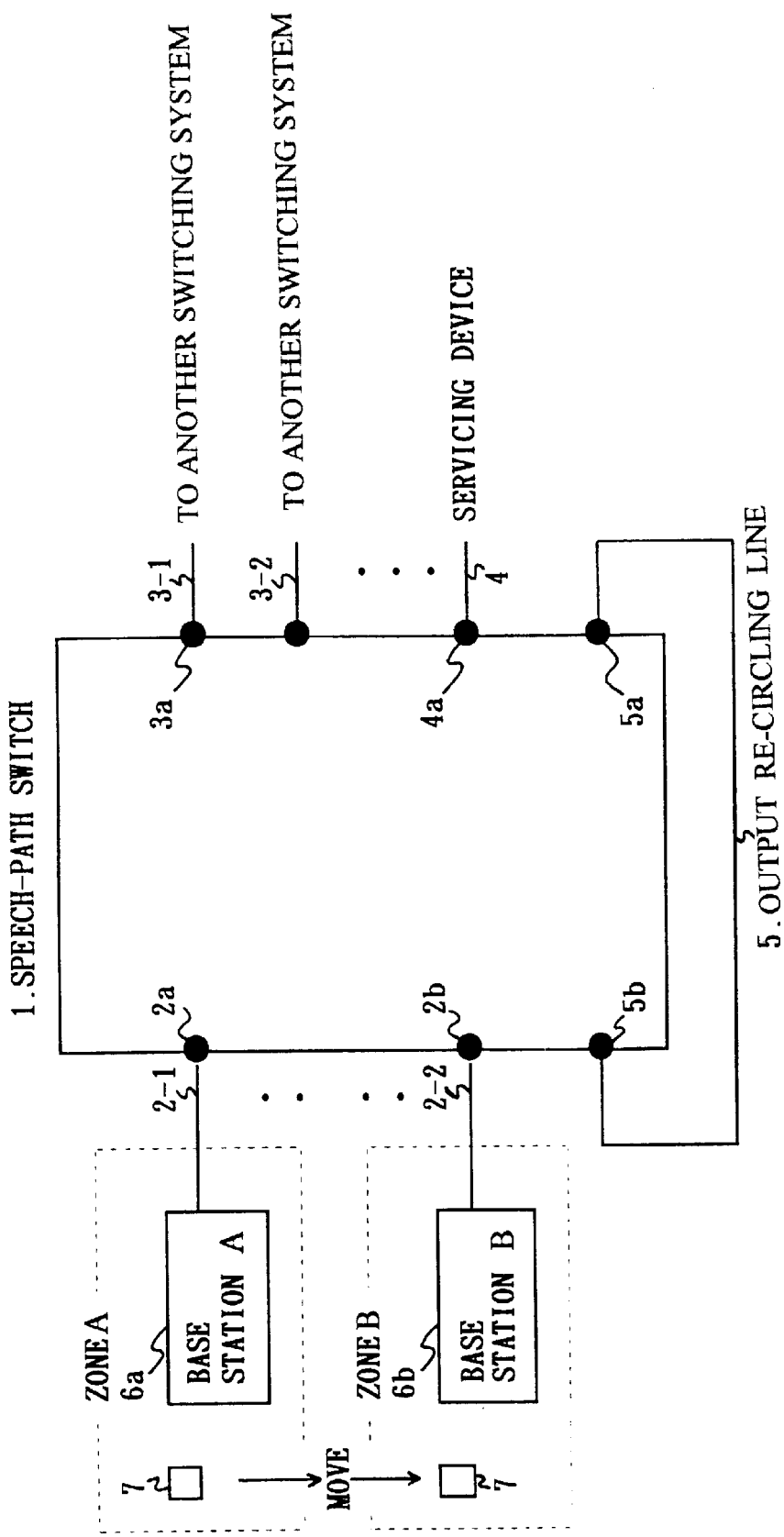
FIG. 1 is a view showing a structure of a speech-path switch according to a first embodiment of the present invention.

FIG. 1 shows a structure of a speech-path switch according to a first embodiment.

A speech-path switch 1 has a function of establishing and terminating a speech-path which connects a subscriber's line with a trunk in a switching system.

The speech-path switch 1 comprises a plurality of input ports 2a, 2b, 5b, . . . and a plurality of output ports 3a, 4a, 5a, . . . .

Each of the input ports 2a, 2b and 5b is connected to one end of subscriber's lines 2-1, 2-2, . . . .

The other end of the subscriber's line 2-1 is connected to a base station A (6a) located in a specific zone A while the other end of the subscriber's line 2—2 is connected to a base station B (6b) located in a specific zone B.

The base station A (6a) has a function of transmitting and receiving data to and from a mobile device 7 located within the specific zone A using radio waves. The base station B (6b) has a function of transmitting and receiving data to and from the mobile device 7 located within the specific zone B using radio waves.

Each of the output ports 3a, 3b, 4a, 5a, . . . is connected to one end of trunks 3-1, 3-2, . . . and one end of a transmitting and receiving line 4.

The other end of the trunks 3-1, 3-2, . . . is connected to another switching system.

The other end of the transmitting and receiving line 4 is connected to a servicing device. The servicing device may be an audio source device for transmitting a voice message to the mobile device.

In addition, the specific input port 5b and the specific output port 5a are connected to each other through an output re-circling line 5. The an output re-circling line is a line for supplying the output of the output port 5a to the input port 5b.

Figure 2:
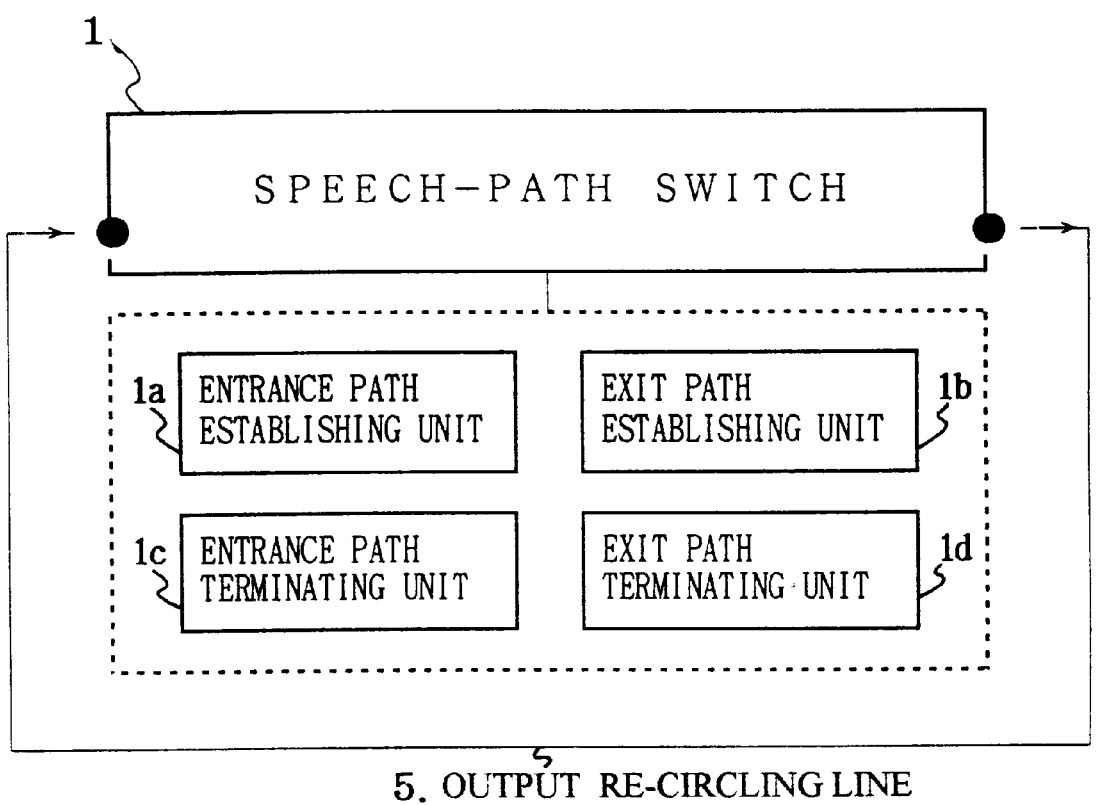
FIG. 2 is a function-based structural block diagram of a speech-path controlling device according to the first embodiment.

FIG. 2 is a block diagram showing a function-based structure of a speech-path controlling device according to the first embodiment. The speech-path controlling device is a device realized by a central processing unit (CPU) allocated for call processing and a program stored in a memory in the switching system.

The switch-path controlling device shown in FIG. 2 comprises an entrance path establishing unit 1a, an entrance path terminating unit 1c, an exit path establishing unit 1b and an exit path terminating unit 1d.

The entrance path establishing unit 1a has a function of establishing a speech-path between the input port 2a (or the input port 2b) connected to the subscriber's line 2-1 (or the subscriber's line 2—2) and the output port 5a connected to the output re-circling line 5.

The entrance path terminating unit 1c is has a function of terminating the speech-path between the input port 2a (or the input port 2b) connected to the subscriber's line 2-1 (or 2—2) and the output port 5a connected to the output re-circling line 5.

The exit path establishing unit 1b has a function of establishing a speech-path between the output port 3a (or 3b) connected to the trunk 3-1 (or the trunk 3-2) and the input port 5b connected to the output re-circling line 5. In addition, the exit path establishing unit 1b has a function of establishing a speech-path between the output port 4a connected to the transmitting and receiving line 4 and the input port 5b connected to the output re-circling line 5.

The exit path terminating unit 1b has a function of terminating the speech-path between the output port 3a (or the output port 3b) connected to the trunk 3-1 (or 3-2) and the input port 5b connected to the output re-circling line 5. In addition, the exit path terminating unit 1b has a function of terminating the speech-path between the output port 4a connected to the transmitting and receiving line 4 and the input port 5b connected to the turn-around line 5.

Figure 3:
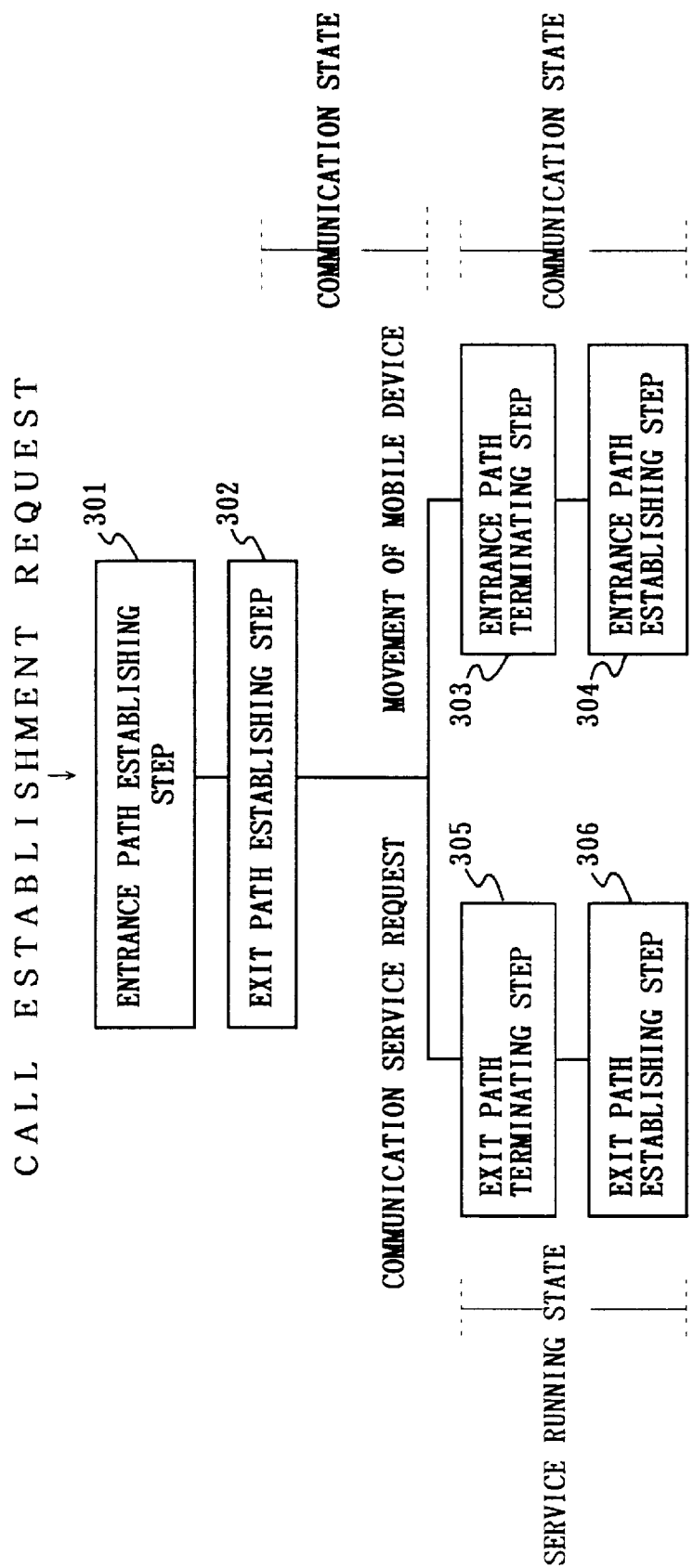
FIG. 3 is a view for use in describing a process for controlling the speech-path according to the first embodiment.

Operational procedures of the speech-path controlling device is described in conjunction with FIG. 3.

When a user of the mobile device 7 located in the specific zone A calls the called number of the destination terminal following the sending processing, the base station A (6a) receives the called number. The base station A (6a) sends the called number on the subscriber's line 2-1.

On receiving the called number transmitted on the subscriber's line 2-1, the switching system analyzes the called number to determine the destination switching system and traps the trunk 3-1 connected to the destination switching system. In addition, the switching system traps the turn-around line 5 in a free state. The switching system then operates the speech-path controlling device.

The speech-path controlling device first operates the entrance path establishing unit 1a.

The entrance path establishing unit 1a establishes the path between the input port 2a connected to the subscriber's line 2-1 and the output port 5a connected to the turn-around line 5 (301).

Subsequently, the speech-path controlling device operates the exit path establishing unit 1b.

The exit path establishing unit 1b establishes the path between the output port 3a connected to the trunk 3-1 and the input port 5b connected to the turn-around line 5 (302). At this time, the mobile device 7 is in communication with the called terminal.

If the mobile device 7 in communication moves out of the specific zone A to the specific zone B, the base station B (6b) covering the specific zone B notifies the speech-path controlling device of movement of the mobile device 7.

The speech-path controlling device successively operates the entrance path terminating unit 1c and the entrance path establishing unit 1a.

The entrance path terminating unit 1c terminates the speech-path established between the input port 2a of the subscriber's line 2-1 connected to the base station A (6a) and the output port 5a of the output re-circling line 5 (303).

Subsequently, the entrance path establishing unit 1a establishes a new speech-path between the input port 2b of the subscriber's line 2—2 connected to the base station B (6b) and the output port 5a of the output re-circling line 5 (304).

In response to a servicing request for the communication service supplied from the mobile device 7 in communication, the speech-path controlling device successively operates the exit path terminating unit 1d and the exit path establishing unit 1b.

The exit path terminating unit 1d terminates the speech-path established between the output port 3a of the trunk 3-1 connected to the other switching system and the input port 5b of the output re-circling line 5 (305).

The exit path establishing unit 1b establishes the speech-path between the output port 4a of the transmitting and receiving line 4 connected to the communication servicing device and the input port 5b of the output re-circling line 5 (306).

For example, when the communication servicing device is the audio source device for generating a specific voice message, the speech-path controlling device first operates the exit path terminating unit 1d upon occurrence of an interrupted call to the destination terminal in communication.

The exit path terminating unit 1d terminates the speech-path established between the output port 3a of the trunk 3-1 and the input port 5b of the output re-circling line 5. Subsequently, the speech-path controlling device operates the exit path establishing unit 1b.

The exit path establishing unit 1b establishes the path between the output port 4a of the transmitting and receiving line 4 connected to the audio source device. As a result of this establishment, the mobile device 7 receives a voice message from the audio source device during interrupting communication of the destination terminal.

Thereafter, when the destination terminal is out of interrupting communication, the speech-path controlling device successively operates the exit path terminating unit 1d and the exit path establishing unit 1b.

The exit path terminating unit 1d terminates the speech-path established between the output port 4a connected to the transmitting and receiving line 4 and the input port 5b connected to the output re-circling line 5.

The exit path establishing unit 1b then establishes the speech-path between the output port 3a of the trunk 3-1 connected to the destination terminal and the input port 5b connected to the output re-circling line 5.

Embodiment 2

Figure 4:
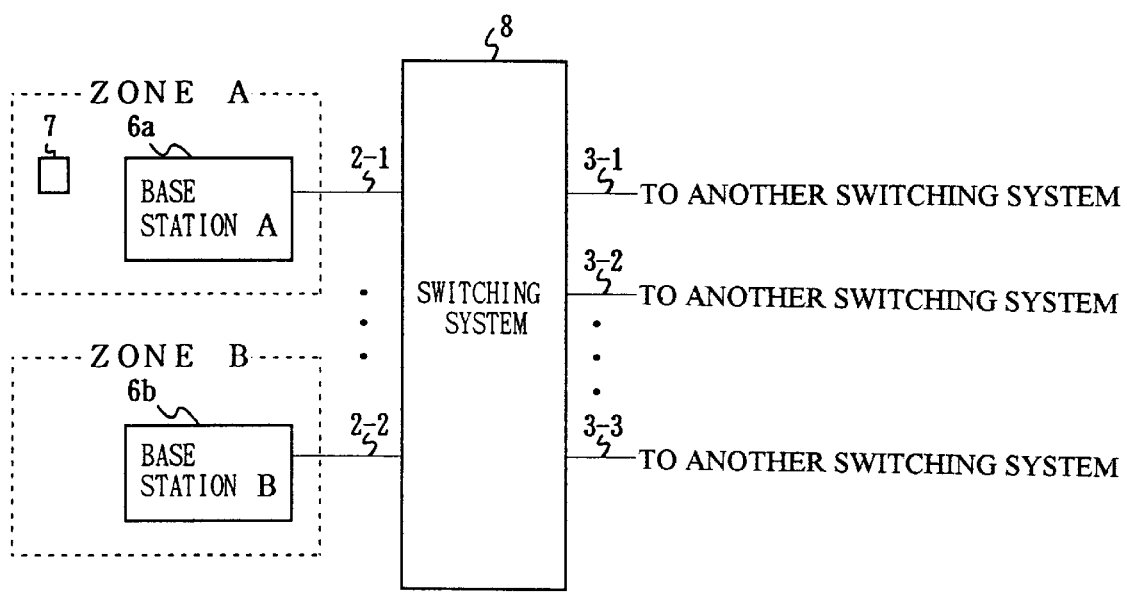
FIG. 4 a schematic structural block diagram of a switching network according to a second embodiment.

FIG. 4 shows a schematic structural block diagram of a switching network according to a second embodiment of the present invention.

This switching network comprises a switching system 8 connected to one end of the subscriber's lines 2-1, 2—2, and one end of the trunks 3-1, 3-2, 3—3, . . . .

The other end of the subscriber's lines 2-1, 2—2, . . . is connected to the base station A (6a) and the base station B (6b) (hereinafter, referred to as the base station 6 generically). The base station A (6a) is disposed in the specific zone A while the base station B (6b) is disposed in the specific zone B.

On the other hand, the other end of the trunks 3-1, 3-2, 3—3, . . . is connected to the other switching system.

The base station 6 has a function of transmitting and receiving data to and from the mobile device 7 located in the specific zone using the radio waves and a function of transmitting and receiving the data through the switching system 8 and the subscriber's lines 2-1, 2—2, . . . .

The base station 6 also has a function of sending a call signal to the mobile device 7 every predetermined period. The mobile device 7 has a function of transmitting, in response to the call signal supplied from the base station 6, an identification number for specifying an individual mobile device.

On receiving the identification number supplied from the mobile device 7, the base station 6 recognizes that the mobile device identified by the identification number is located within the specific zone it covers.

In addition, the base station 6 has a function of transmitting the identification number of the mobile device 7 to the switching system 8 when it recognizes that the mobile device 7 comes to the specific zone where it covers. More specifically, the base station 6 comprises a storing unit for holding the identification number of each mobile device 7 located within the specific zone where it covers. The base station 6 verifies the identification numbers stored in the storing unit with the identification number supplied from the mobile device in response to the call signal. If the identification number of the mobile device 7 is not stored in the storing unit, the base station 6 determines that the mobile device 7 in question is just coming.

The mobile device 7 has a function of comparing, when receiving the call signals from two or more base stations 6, the intensity of the radio waves of these call signals to respond to the call signal with the strongest radio wave.

Figure 5:
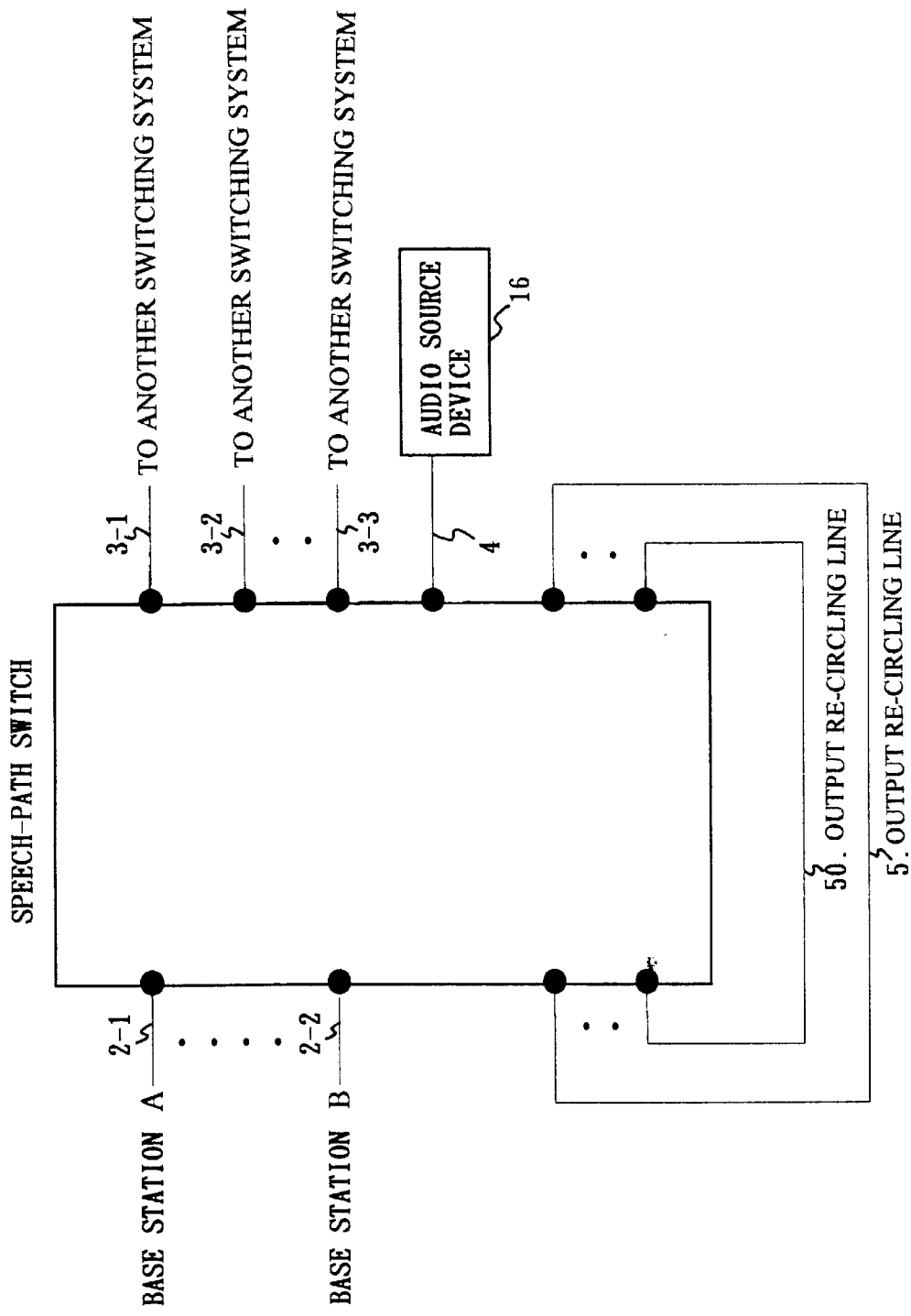
FIG. 5 is a view illustrating connections among communication lines in the speech-path switch according to the second embodiment.
Figure 6:
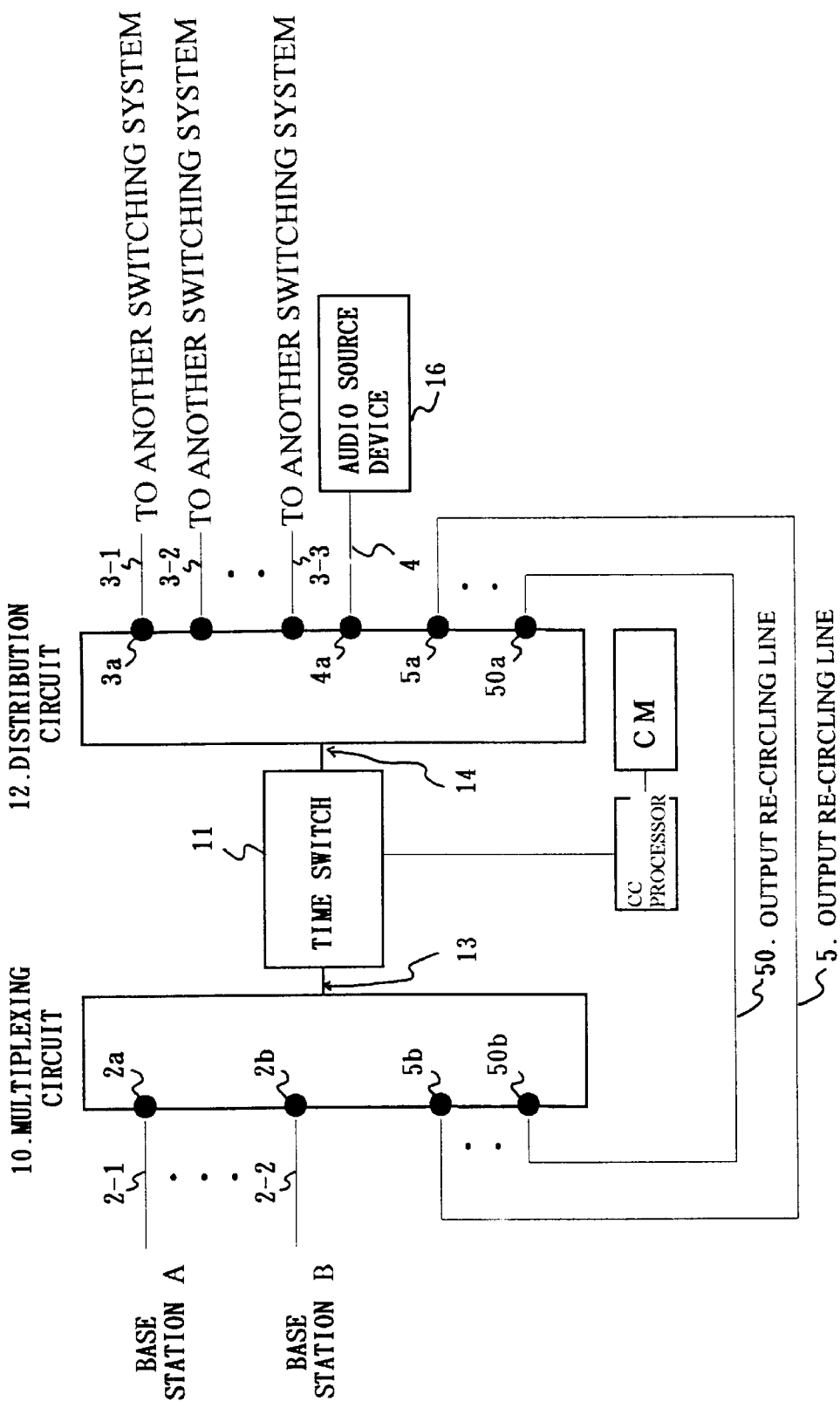
FIG. 6 is a view showing an internal structure of a speech-path switch according to the second embodiment.

FIG. 5 is a diagram illustrating connections among communication lines in the speech-path switch 1 of the switching system 8. FIG. 6 is a block diagram showing an internal structure of the speech-path switch 1 according to the second embodiment of the present invention.

The speech-path switch in the second embodiment comprises a multiplexing circuit 10, a time switch 11, a distribution circuit 12, a call control processor (CC) and a call control memory (CM).

The multiplexing circuit 10 and the time switch 11 are connected to each other through an input highway 13.

The time switch 11 and the distribution circuit 12 are connected to each other through an output highway 14.

The multiplexing circuit 10 comprises a plurality of input ports 2a, 2b, 5b, 50b, . . . and a single output port (not shown). The input ports 2a, 2b, . . . are connected to the respective subscriber's lines 2-1, 2—2, . . . . On the other hand, the output port is connected to the input highway 13.

The multiplexing circuit 10 has a function of providing time-divisional multiplexing signals supplied from the subscriber's lines 2-1, 2—2, . . . and sending the signals to the input highway 13.

The time switch 11 has a function of switching output paths of the individual signal (determine to which trunk 3-1, 3-2, 3—3, . . . the signal is directed or to the transmitting and receiving line 4 the signal is directed) of the multiplexed signals supplied from the input highway 13. More specifically, the time switch 11 has the function of switching the temporal position of each channel on the transmission path.

The distribution circuit 12 comprises a single input port and a plurality of output ports 3a, 4a, 5a, 50a, . . . . The input port is connected to one end of the output highway 14. The other end of the output highway 14 is connected to the time switch 11. The output ports 3a, . . . are connected to the respective trunks 3-1, 3-2, 3—3, . . . connected to the other switching system. The output port 4a is connected to the transmitting and receiving line 4 which is connected in turn to an audio source device 16.

The speech-path switch according to this second embodiment comprises the output re-circling lines 5, 50, . . . for supplying the outputs of the output ports 5a, 50a, . . . of the distribution circuit 12 to the input ports 5b, 50b, . . . respectively, of the multiplexing circuit 10. Each of the output re-circling lines 5, 50, . . . is a communication line consisting of one or more channels.

Each of the subscriber's lines 2-1, 2—2, . . . and the trunks 3-1, 3-2, 3—3, . . . is a single digital line (64 kbps) or a multiplexed digital line (2 Mbps, for example). The transferring speed of each of the input and output highways 13 and 14 is, for example, several tens Mbps.

FIG. 7 is a block diagram showing a function-based logic structure of the time switch 11 according to the first embodiment.

The time switch 11 comprises an input port switching unit 11a and an output port switching unit 11b, connected through fixed lines corresponding to the output re-circling lines 5, 50, . . . .

The input port switching unit 11a comprises input ports 200a, 200b, . . . corresponding to the input ports 2a, 2b, . . . , respectively, of the multiplexing circuit 10 and an output port 500a corresponding to the output port 5a of the distribution circuit 12. The input ports 200a, 200b, . . . are connected to the respective communication channels corresponding to the subscriber's lines 2-1, 2—2, . . . . The output port 500a is connected to a communication channel of a fixed line corresponding to the output re-circling line 5.

The input port switching unit 11a has a function of establishing and terminating paths between the input ports 200a, 200b, . . . and an output port 500a.

The output port switching unit 11b comprises output ports 300a, 400a, . . . corresponding to the output ports 3a, 4a, . . . , respectively, of the distribution circuit 12 and an input port 500b corresponding to the input port 5b of the multiplexing circuit 10. The output port 300a is connected to communication channels corresponding to the trunks 3-1, 3-2, 3—3, . . . . The output ports 400a is connected to a communication channel corresponding to the transmitting and receiving line 4. In addition, the input port 500b is connected to a communication channel of a fixed line corresponding to the output re-circling line 5.

The output port switch 11b has a function of establishing and terminating paths between the input port 500b and the output ports 300a, 400a, . . . .

The time switch 11 comprises a speech-path controlling device 15 for indicating establishment and termination of the paths to the input port switching unit 11a and the output port switching unit 11b.

The speech-path controlling device 15 is a device realized by the call controlling processor (CC) operable in accordance with programs stored in the call control memory (CM).

The speech-path controlling device 15 comprises an entrance path establishing unit 15a, an entrance path terminating unit 15b, an exit path establishing unit 15c and an exit path terminating unit 15d.

The entrance path establishing unit 15a has a function of indicating, to the input port switching unit 11a, the input ports 200a, 200b, . . . and the output port 500a between which the path should be established.

The entrance path terminating unit 15b has a function of indicating, to the input port switching unit 11a, the path to be terminated. More specifically, the entrance path terminating unit 15b has the function of indicating the input ports 200a, 200b, . . . and the output port 500a between which the path to be terminated is established.

The exit path establishing unit 15c has a function of indicating, to the output port switching unit 11b, the input port 500b and the output ports 300a, 400a, . . . between which the path should be established.

The exit path terminating unit 15d has a function of indicating, to the output port switching unit 11b, the path to be terminated. More specifically, the exit path terminating unit 15d has the function of indicating the input port 500b and the output ports 300a, 400a, . . . between which the path to be terminated is established, as in the case of the above mentioned entrance path terminating unit 15b.

The speech-path controlling unit 15 has a function of registering the busy state of the path in the call control memory (CM).

Described now is the operational procedures carried out by the speech-path controlling device according to this second embodiment.

Figure 8:
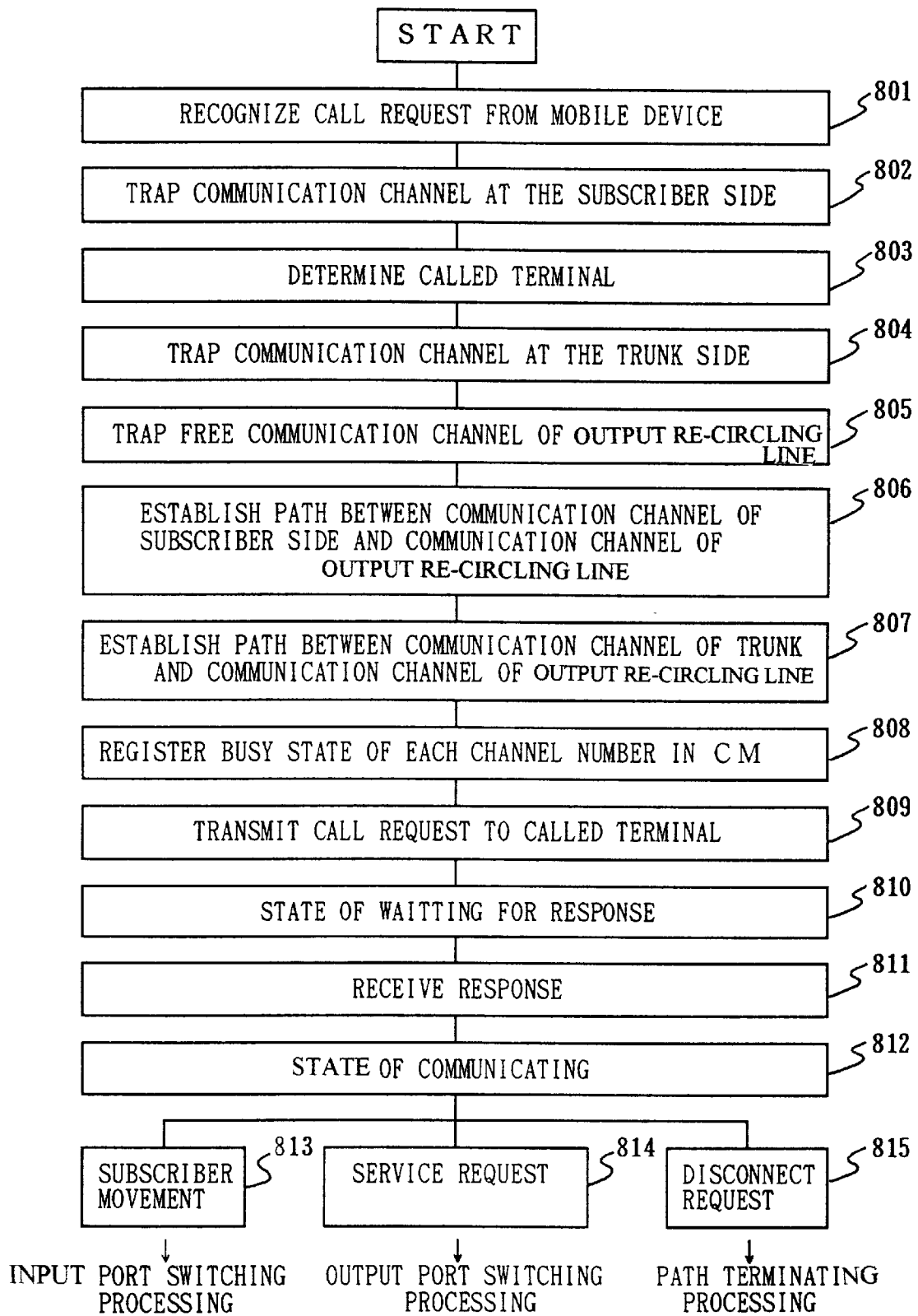
FIG. 8 is a schematic flow chart illustrating operational procedures carried out by the switching system according to the second embodiment.

FIG. 8 is a flow chart illustrating a schematical operation of the switching system 8 upon initiation of communication.

In this event, it is assumed that the mobile device 7 is located within the specific zone covered by the base station A (6a).

To initiate communication, a user of the mobile device 7 sets the mobile device 7 into an off-hook (turn ON the power) state and calls the called telephone number of the destination. In response to this, the mobile device 7 sends successively the call establishment request signal and the called telephone number.

The call establishment request signal and the called telephone number are received by the base station A (6a) and are transmitted therefrom to the switching system 8 through a control channel of the subscriber's line 2-1.

The switching system 8 receives the call establishment request signal and the called telephone number supplied from the mobile device (Step 801). In response to this, the switch system 8 traps a free communication channel (CH1) on the subscriber's line 2-1 (Step 802).

Subsequently, the switch system 8 determines the switching system covering the called terminal according to the called telephone number and determines the trunks 3-1, 3-2, 3—3, . . . (the trunk 3-1 here) connected to the destined switching system (Step 803). The switch system 8 then traps a free communication channel (CH2) on the trunk 3-1 (Step 804).

The switch system 8 notifies the call control processor (CC) of the communication channel number (CH1) of the subscriber's line and the communication channel number (CH2) of the trunk 3-1 to operate the speech-path controlling device 15.

The speech-path controlling device 15 traps a free communication channel (FCH) on the output re-circling line 5 (or the output re-circling line 50) (Step 805).

The speech-path controlling device 15 notifies the entrance path establishing unit 15a of the input port 200a of the communication channel (CH1) trapped on the subscriber's line 2-1 and the output port 500a of the communication channel (FCH) trapped on the output re-circling line 5.

The entrance path establishing unit 15a establishes a path between the input port 200a and the output port 500a (Step 806).

The speech-path controlling unit 15 notifies the exit path establishing unit 15c of the input port 500b of the communication channel (FCH) trapped on the output re-circling line 5 and the output port 300a of the communication channel (CH2) trapped on the trunk 3-1.

Figure 9:
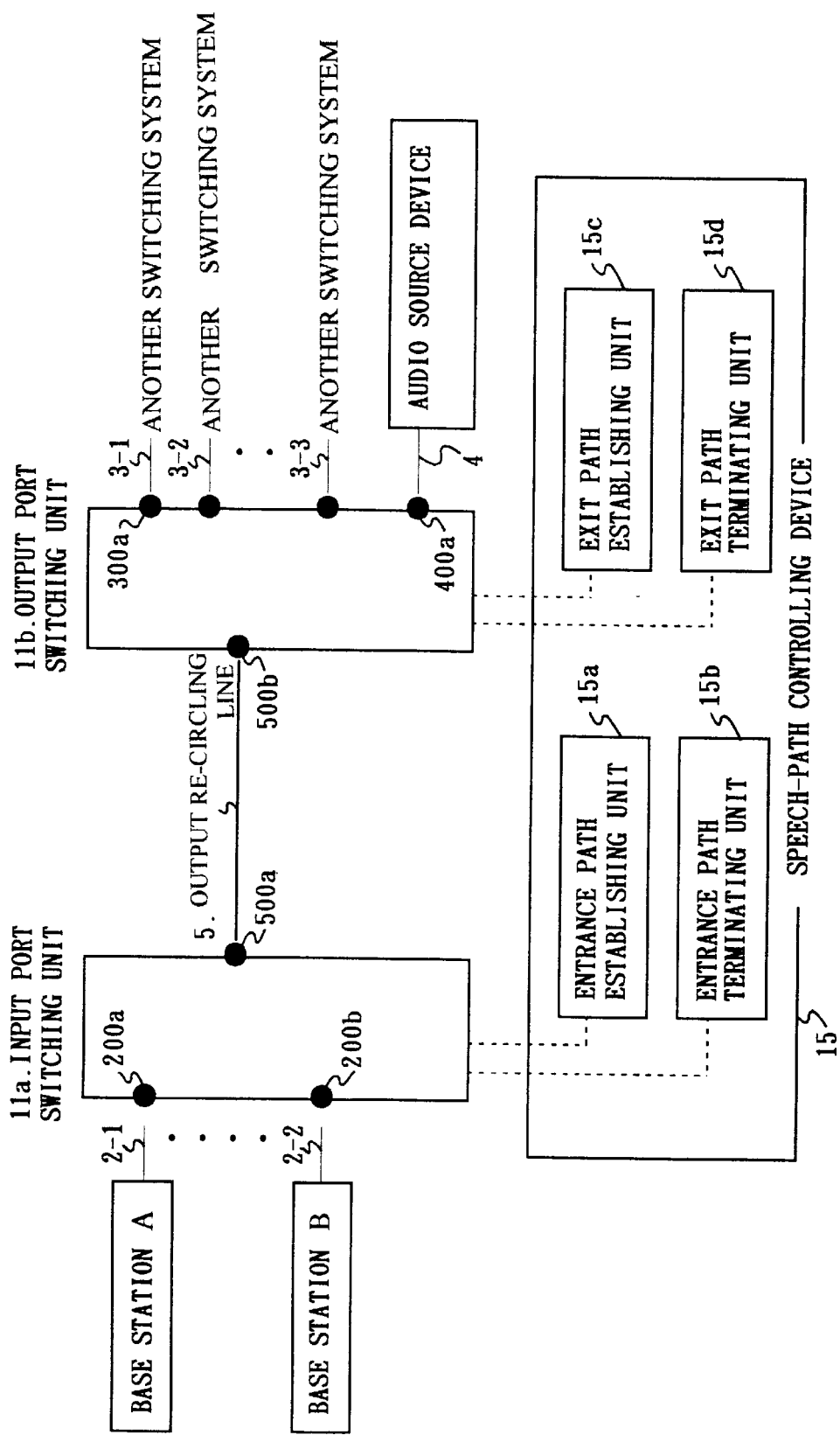
FIG. 9 is a view showing a first example of connection in the time switch.

The exit path establishing unit 15c establishes a path between the input port 500b and the output port 300a (Step 807) (see FIG. 9).

After completion of establishment of the paths in the input port switching unit 11a and the output port switching unit 11b, the speech-path controlling unit 15 registers in the call control memory (CM) the communication channel number (CH1) on the subscriber's line 2-1, the communication channel number (CH2) on the trunk 3-1, and the communication channel number (FCH) on the output re-circling line 5 (Step 808).

The switch system 8 transmits the call establishment request signal to the called device through the paths established on the speech-path switch 1 (Step 809), and waits for a call establishment request acceptance signal supplied from the called device (Step 810).

On receiving the call establishment request acceptance signal (Step 811), the switch system 8 notifies the mobile device 7 of connection of the communication line.

Subsequently, the mobile device 7 and the called terminal are in communication state (Step 812).

The switch system 8 then recognizes that the mobile device 7 moves out of the specific zone covered by the base station A (6*a*) to the specific zone covered by other base station (Step 813). In response to this, the switch system 8 carries out an input port switching processing.

In addition, on receiving the communication service request from the mobile device 7 (Step 814), the switch system 8 carries out an output port switching processing.

Further, on receiving a call disconnection request from the mobile device 7 or the called terminal (Step 815), the switch system 8 carries out a path termination processing.

Figure 10:
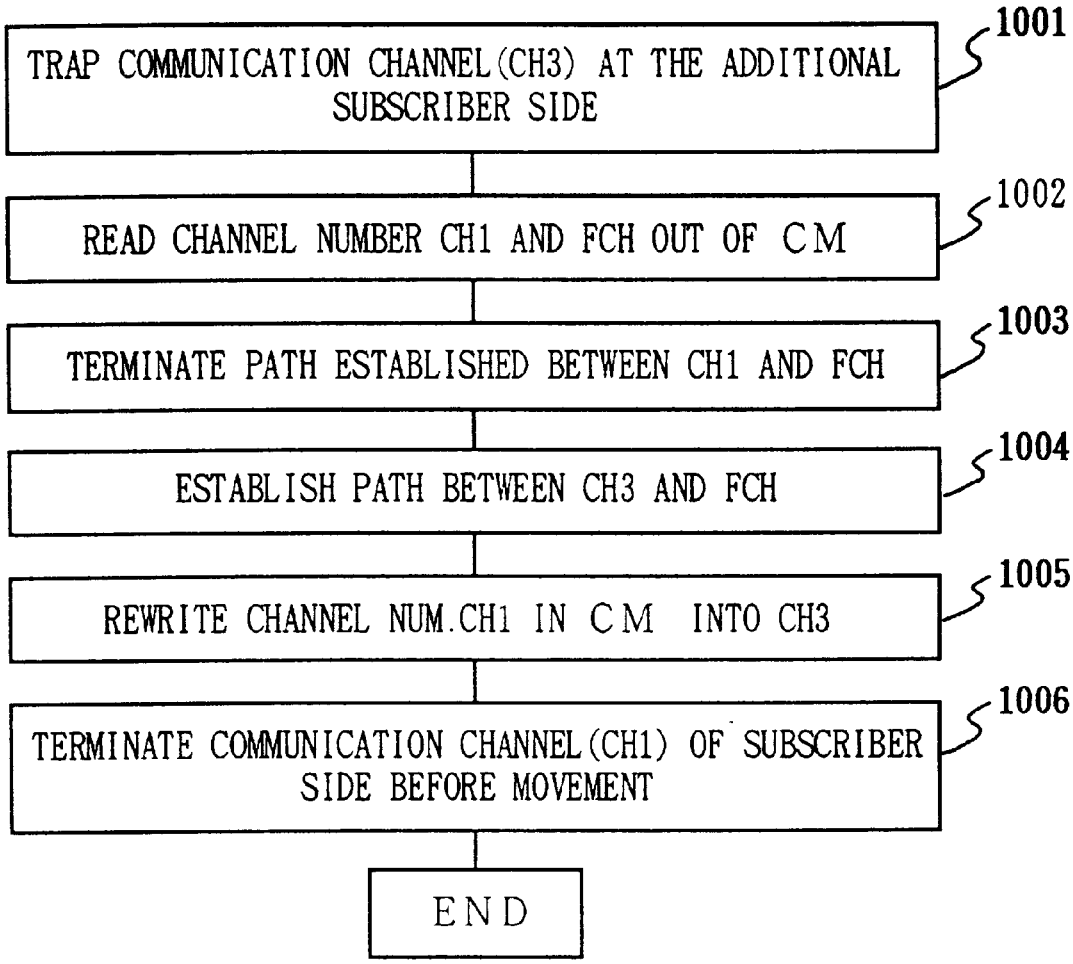
FIG. 10 is a flow chart of an input port switching processing.

The above mentioned input port switching processing is described in conjunction with the flow chart shown in FIG. 10.

When the mobile device 7 moves out of the specific zone covered by the base station A (6*a*) to the specific zone covered by the base station B (6*b*), the base station B (6*b*) determines the movement of the mobile device 7 and notifies the switching system 8 of the identification number of the mobile device 7.

On receiving from the base station B (6*b*) the notification of movement of the mobile device 7, the switching system 8 traps a communication channel (CH3) in a free state on the subscriber's line 2—2 connected to the base station B (6*b*) (Step 1001).

The switch system 8 notifies the call control processor (CC) of the latest communication channel number (CH3) to operate the speech-path controlling device 15.

The speech-path controlling device 15 reads out of the call control memory (CM) path information used for communication between the mobile device 7, i.e., the communication channel number (CH1) on the subscriber's line 2-1 and the communication channel number (FCH) on the output re-circling line 5 (Step 1002).

The speech-path controlling device 15 notifies the entrance path terminating unit 15*b* of the input port 200*a* of the communication channel (CH1) on the subscriber's line 2-1 and the output port 500*a* of the communication channel (FCH) on the output re-circling line 5.

The entrance path terminating unit 15*b* terminates, in the input port switching unit 11*a*, the path established between the input port 200*a* of the communication channel (CH1) on the subscriber's line 2-1 and the output port 500*a* of the communication channel (FCH) on the output re-circling line 5 (Step 1003).

The speech-path controlling device 15 notifies the entrance path establishing unit 15*a* of the input port 200*b* of the communication channel (CH3) on the subscriber's line 2—2 and the output port 500*b* of the communication channel (FCH) on the output re-circling line 5.

The entrance path establishing unit 15*a* establishes an additional path between the input port 200*b* and the output port 500*a* (Step 1004).

The speech-path controlling device 15 updates the communication channel number (CH1) registered in the call control memory (CM) into the additional communication channel number (CH3) (Step 1005).

Figure 11:
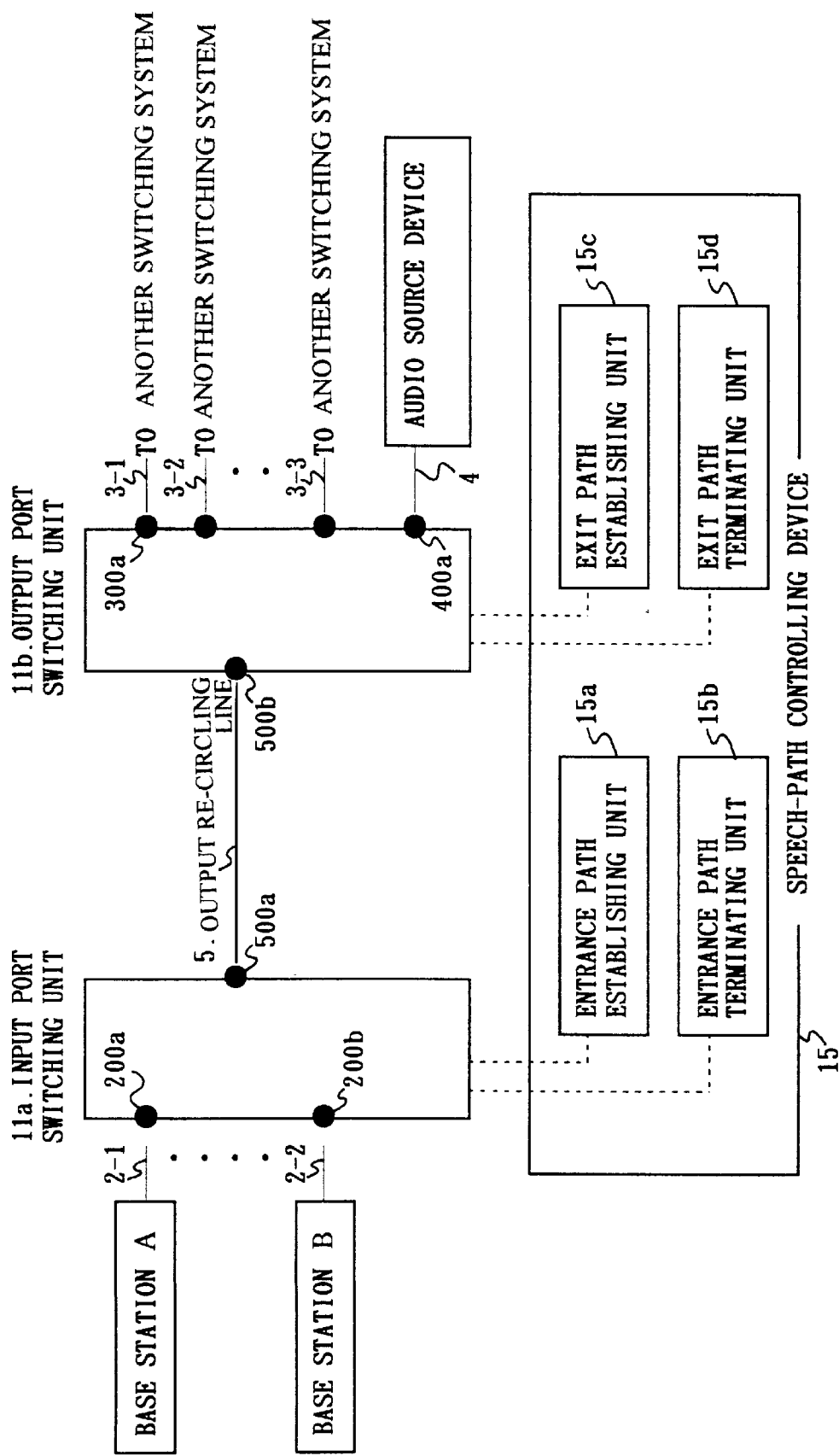
FIG. 11 is a view showing a second example of connection in the time switch.

The switch system 8 terminates the communication channel (CH1) trapped on the subscriber's line 2-1 (Step 1006) (see FIG. 11).

Figure 12:
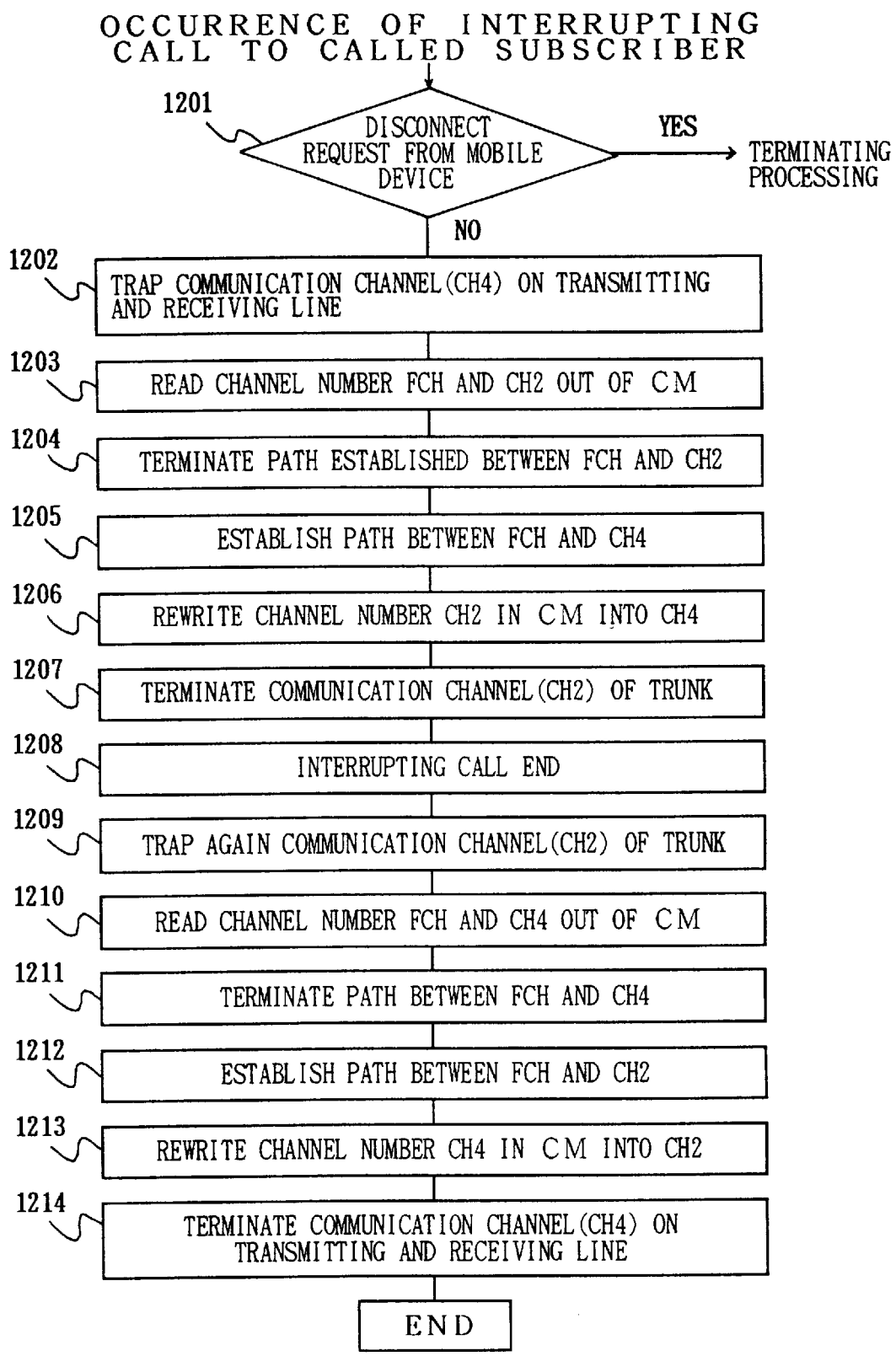
FIG. 12 is a flow chart of an output port switching processing.

The above mentioned output port switching processing is described in conjunction with the flow chart shown in FIG. 12.

On determining occurrence of the interrupting call on the called terminal communicating with the mobile device 7, switch system 8 determines whether or not the call disconnection request is received from the mobile device 7 (Step 1201).

If no call disconnection request is received from the mobile device, the switch system 8 traps a free communication channel (CH4) on the transmitting and receiving line 4 connected to the audio source device 16 (Step 1202). The switch system 8 notifies the call control processor (CC) of this communication channel (CH4) to operate the speech-path controlling device 15. The speech-path controlling device 15 reads out of the call control memory (CM) path information used for communication between the mobile device 7, i.e., the communication channel number (FCH) on the output re-circling line 5 and the communication channel number (CH2) on the trunk 3-1 (Step 1203).

The speech-path controlling device 15 notifies the exit path terminating unit 15*d* of the input port 500*b* of the communication channel (FCH) on the output re-circling line 5 and the output port 300*a* of the communication channel (CH2) on the trunk 3-1.

The exit path terminating unit 15*d* terminates the path established between the input port 500*b* and the output port 300*a* (Step 1204).

The speech-path controlling device 15 notifies the exit path establishing unit 15*c* of the input port 500*b* of the communication channel (FCH) on the output re-circling line 5 and the output port 400*a* of the communication channel (CH4) on the transmitting and receiving line 4.

The exit path establishing unit 15*c* establishes a path between the input port 500*b* and the output port 400*a* (Step 1205).

The speech-path controlling device 15 rewrites the communication channel number CH2 in the call control memory (CM) into the communication channel number CH4 (Step 1206).

Figure 13:
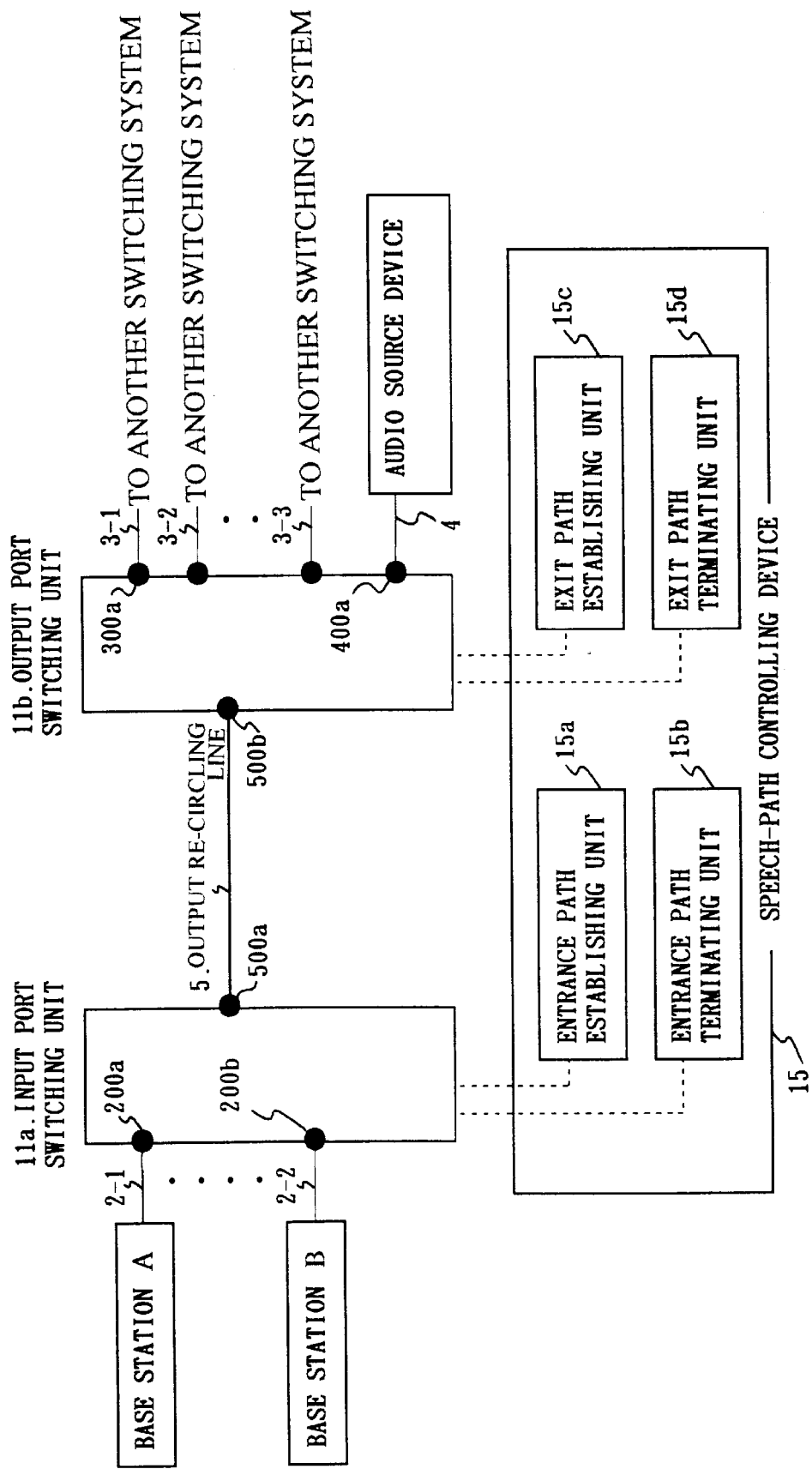
FIG. 13 is a view showing a third example of connection in the time switch.

The switching system 8 terminates the communication channel (CH2) on the trunk 3-1 (Step 1207) (see FIG. 13).

After completion of interrupting communication of the called terminal (Step 1208), the switching system 8 traps again the communication channel (CH2) on the trunk 3-1 connected to the called terminal (Step 1209).

The switching system 8 notifies the call control processor (CC) of this communication channel (CH2) to operate the speech-path controlling device 15.

The speech-path controlling device 15 reads out of the call control memory (CM) path information used for the communication service for the mobile device 7, i.e., the communication channel number (FCH) on the turn-around line 5 and the communication channel number (CH4) on the transmitting and receiving line 4 (Step 1210).

The speech-path controlling device 15 notifies the exit path terminating unit 15*d* of the input port 500*b* of the communication channel number (FCH) on the turn-around line 5 and the output port 400*a* of the communication channel number (CH4) on the transmitting and receiving line 4.

The exit path terminating unit 15*d* terminates the path established between the input port 500*b* and the output port 400*a* (Step 1211).

The speech-path controlling device 15 notifies the exit path establishing unit 15*c* of the input part 500*b* of the communication channel (FCH) on the output re-circling line 5 and the out put port 300*a* of the communication channel (CH4) on the trunk 3-1.

The exit path establishing unit 15*c* establishes a path between the input port 500*b* of the communication channel (FCH) on the output re-circling line 5 and the output port 300*a* of the communication channel (CH4) on the trunk 3-1 (Step 1212).

The speech-path controlling device 15 rewrites CH4 in the call control memory (CM) into CH2 (Step 1213).

The switching system 8 terminates the communication channel number (CH4) on the transmitting and receiving line 4 (Step 1214).

Figure 14:
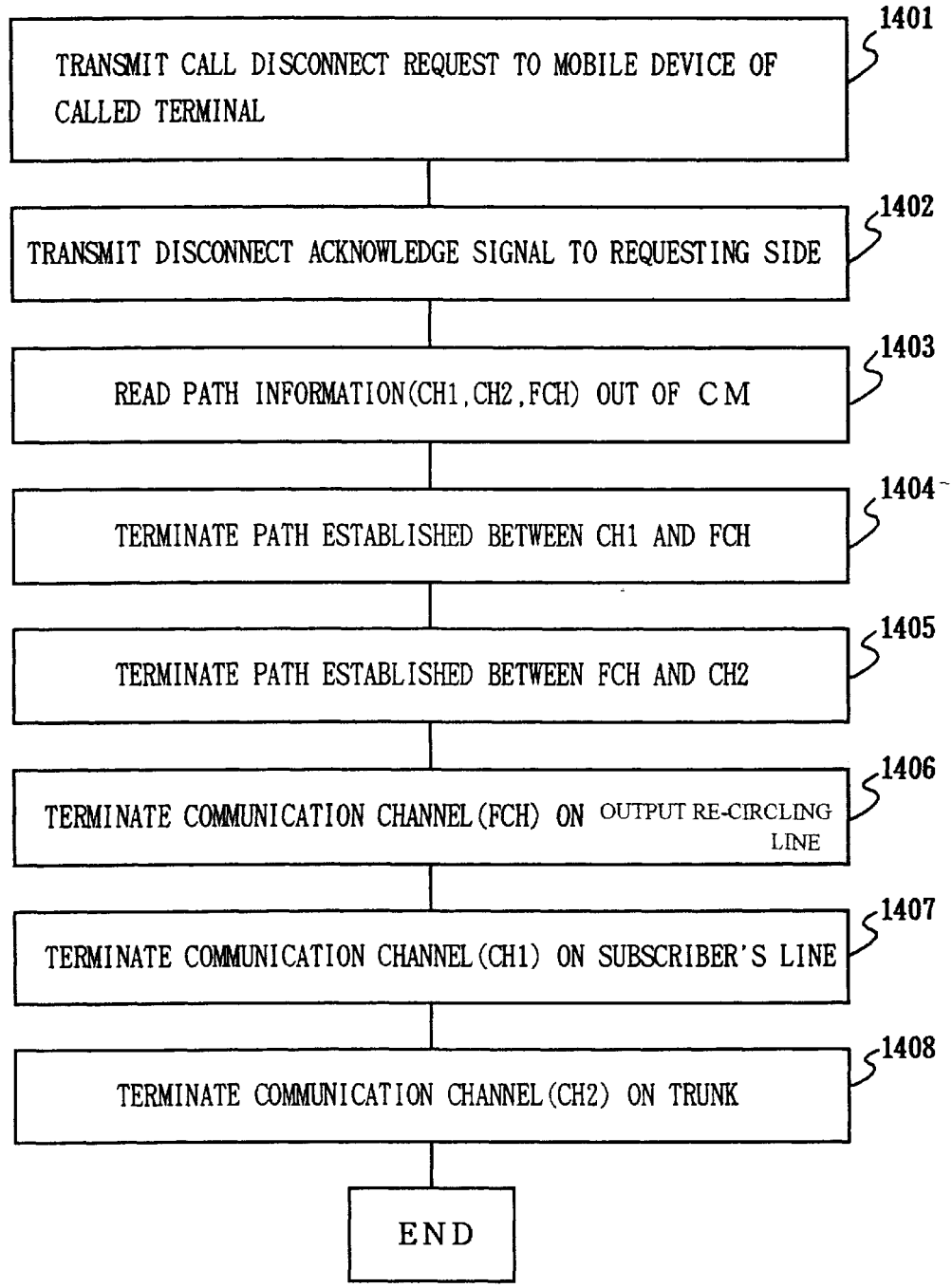
FIG. 14 is a flow chart showing terminating operation.

The above mentioned termination processing is described in conjunction with the flow chart shown in FIG. 14.

On receiving the call disconnection request from the mobile device 7 or the called terminal, the switching system 8 transmits the call disconnection request to the destination (Step 1401).

The switching system 8 returns a call disconnection acknowledge signal to the requesting device (step 1402).

The switching system 8 notifies the call control processor (CC) of a path termination command to operate the speech-path controlling device 15.

In response to the path termination command, the speech-path controlling device 15 reads out of the call control memory (CM) path information regarding to the mobile device 7, i.e., the communication channel number (CH1) on the subscriber's line 2—2, the communication channel number (CH2) on the trunk 3-1 and the communication channel number (FCH) on the output re-circling line 5 (Step 1403).

The speech-path controlling device 15 notifies the entrance path terminating unit 15b of the input port 200a of the communication channel (CH1) on the subscriber's line 2—2 and the output port 500a of the communication channel (FCH) on the output re-circling line 5.

The entrance path terminating unit 15b terminates the path established between the input port 200a and the output port 500a (Step 1404).

The speech-path controlling device 15 then notifies the exit path terminating unit 15d of the input port 500b of the communication channel (FCH) on the output re-circling line 5 and the output port 300a of the communication channel (CH2) on the trunk 3-1.

The exit path terminating unit 15d terminates the path established between the input port 500b and the output port 300a (Step 1405).

The speech-path controlling device 15 terminates the communication channel (FCH) on the output re-circling line 5 (Step 1406).

In addition, the switching system 8 terminates the communication channel (CH1) on the subscriber's line 2—2 and the communication channel (CH2) on the trunk 3-1 (Steps 1407 and 1408).

Embodiment 3

Figure 15:
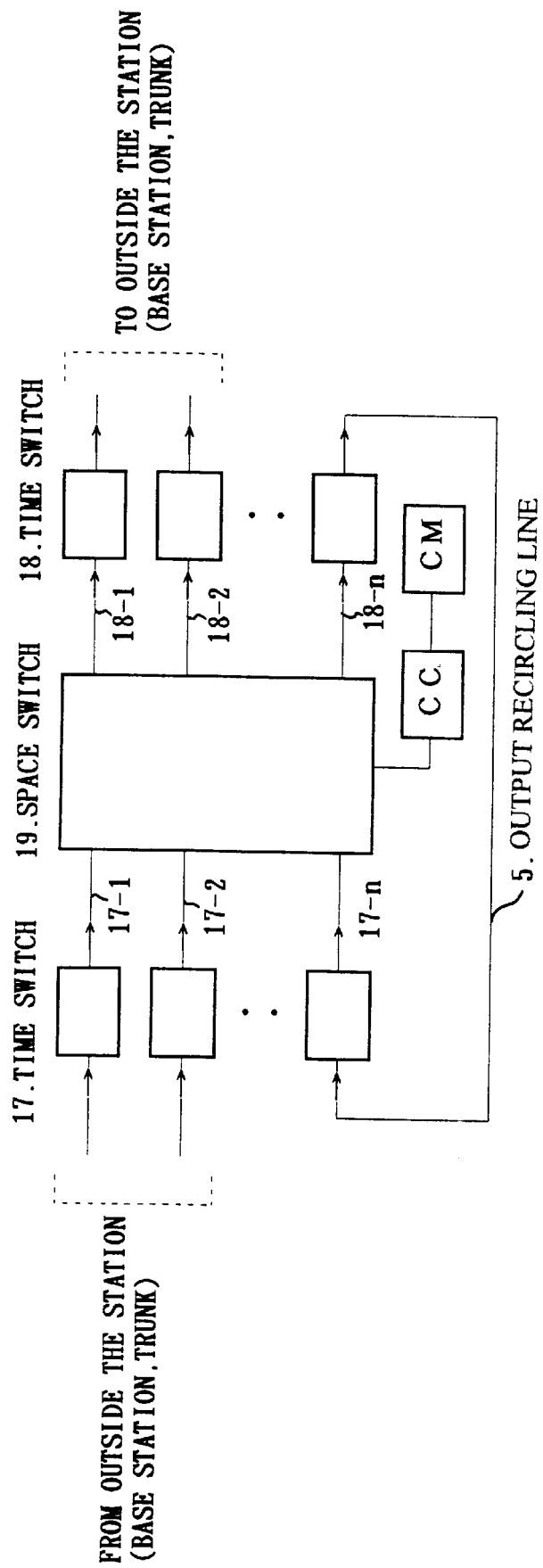
FIG. 15 is a view showing a structure of a speech-path switch in accordance with the third embodiment.

FIG. 15 is a view showing a structure of a speech-path switch according to a third embodiment of the present invention.

As compared with the structure described in the second embodiment, the speech-path switch in this third embodiment is a TST switch in which a space switch 19 is interconnected between a time switch 17 and a time switch 18.

The time switch 17 consists of n stages of time switches 17-1 through 17-n while the time switch 18 consists of n stages of time switches 18-1 through 18-n.

Each of the time switches 17-1 through 17-n and 18-1 through 18-n comprises a single input port and a single output port.

The input port of each of the time switches 17-1 through 17-n is connected to the subscriber's line. The subscriber's line is formed of a plurality of communication channels that are time-divisional multiplexed.

The output port of each of the time switches 17-1 through 17-n is connected to the input highway which in turn is connected to the space switch 19 at the other end thereof.

The input port of each of the time switches 18-1 through 18-n is connected to the one end of the output highway of which the other end is connected to the space switch 19.

The output port of each of the time switches 18-1 through 18-n is connected to the trunk or the transmitting and receiving line. The trunk line is connected to the other switching system while the transmitting and receiving line is connected to the communication service such as the audio source device.

The time switches 17 and 18 have functions of switching temporal position of the communication channels multiplexed on the subscriber's line.

The space switch 19 comprises input ports connected to n numbers of input highways and output ports connected to n numbers of output highways.

The space switch 19 has a function of switching the connection path between the input and output highways.

In this third embodiment, the one ends of the output re-circling line are connected to k numbers of the time switches 17 out of n numbers of time switches, where k is smaller than n. With this respect, the input ports of the k numbers of time switches 18 are connected to the other ends of the output re-circling lines. The turn-around lines are communication lines capable of transmitting the multiplexed signal, which in this embodiment serves to supplying the output of the time switch 18 to the time switch 17.

A function of the space switch 19 in this speech-path controlling device is similar to those described in conjunction with the time switch 11 which is showed in FIG. 7. In addition, the operational procedures and functions of the speech-path controlling device 15 are also similar to those described in the second embodiment. Accordingly, any further description is omitted.

What is claimed is:

1. A speech-path controlling method, in a speech-path switch of a switching network, having a plurality of input ports and a plurality of output ports, for establishing a speech-path between an input port connected to a subscriber's line and an output port connected to a trunk, for connecting said subscriber's line to said trunk, the method comprising the steps of:

providing output re-circling lines in number substantially corresponding to the number of said subscriber's lines, directly connecting specific output ports of said switch to specific input ports of said switch, and for relaying said speech-path under normal conditions;

establishing a direct entrance path, for making use of said speech-path, between the input port connected to said subscriber's line and the specific output port connected to said output re-circling line; and establishing a direct exit path, for making use of said speech-path, between the output port connected to said trunk and the specific input port connected to said output re-circling line.

2. A speech-path controlling method as claimed in claim 1, wherein said subscriber's line is connected to a base station that transmits data to and receives data from a mobile device located within a specific zone using radio waves, said trunk is connected to another switching network.

3. A speech-path controlling method as claimed in claim 2, and further comprising, when a call establish request signal is received from said mobile device through said base station:

an entrance path establishing step for establishing a speech-path between the input port connected to said subscriber's line connected to said base station and the output port connected to said output re-circling line; and an exit path establishing step for establishing a speech-path between an output port connected to the trunk connected to a called switching network and the input port connected to said output re-circling line.

4. A speech-path controlling method as claimed in claim 2, and further comprising, when said mobile device moves to a zone covered by another base station:

an entrance path terminating step for terminating the speech-path established between the input port connected to said subscriber's line connected to said base station and the output port connected to said output re-circling line; and an entrance path establishing step for establishing a speech-path between an input port connected to a subscriber's line connected to said another base station and the output port of said output re-circling line.

5. A speech-path controlling method as claimed in claim 2, wherein one of said output ports of the speech-path switch is connected to one end of a transmitting and receiving line, and another end of the transmitting and receiving line is connected to a communication servicing device, when a communication servicing request is received by said mobile device in communication, the method further comprising:

an exit path terminating step for terminating the speech-path established between an output port connected to said trunk connected to a called switching network and the input port connected to said output re-circling line; and an exit path establishing step for establishing a speech-path between the output port connected to a transmitting and receiving line connected to a communication servicing device and the input port connected to said output re-circling line.

6. A speech-path controlling method as claimed in claim 5, wherein said communication servicing device is a voice trunk for transmitting a voice message to said mobile device.

7. A speech-path controlling method as claimed in claim 5, wherein said communication servicing device is a message storing device for registering voice sound transmitted from said mobile device.

8. A speech-path controlling device, in a speech-path switch of a switching network, said switch having a plurality of input ports and a plurality of output ports and establishing a speech-path between an input port connected to a subscriber's line and an output port connected to a trunk, for connecting said subscriber's line to said trunk, the device comprising:

an output re-circling lines in number substantially corresponding to the number of said subscriber's lines, for directly connecting specific output ports of said switch to specific input ports of said switch, and for relaying said speech-path under normal conditions;

entrance path establishing means for establishing a direct entrance path to use said speech-path between the input port connected to said subscriber's line and the specific output port connected to said output re-circling line; and exit path establishing means for establishing an exit path to use said speech-path between the output port connected to said trunk and the specific input port connected to said output re-circling line.

9. A speech-path controlling device as claimed in claim 8, wherein said subscriber's line is connected to a base station that transmits data to and receives data from a mobile device located within a specific zone using radio waves, and said trunk is connected to another switching network.

10. A speech-path controlling device as claimed in claim 9, and further comprising, when a call establish request signal is received from said mobile device through said base station:

means for establishing a speech-path between the input port connected to said subscriber's line connected to said base station and the output port connected to said output re-circling line; and means for establishing a speech-path between the output port connected to the trunk connected to a called switching network and the input port connected said output re-circling line.

11. A speech-path controlling device as claimed in claim 9, and further comprising, when said mobile device moves to a zone covered by another base station:

entrance path terminating means for terminating the speech-path established between the input port connected to said subscriber's line connected to said base station and the output port connected to said output re-circling line; and means for establishing a speech-path between the input port connected to said subscriber's line connected to said base station and the output port connected to said output re-circling line.

12. A speech-path controlling device as claimed in claim 9, wherein one of the output ports of the speech-path switch is connected to one end of a transmitting and receiving line, and another end of the transmitting and receiving line is connected to a communication servicing device, when a communication servicing request is received by said mobile device in communication, the device comprising:

means for terminating the speech-path established between the output port connected to said trunk connected to a called switching network and the input port connected to said output re-circling line; and means for establishing a speech-path between the output port connected to a transmitting and receiving line connected to a communication servicing device and the input port connected to said output re-circling line.

13. A speech-path controlling device as claimed in claim 12, wherein said communication servicing device is a voice trunk for transmitting a voice message to said mobile device.

14. A speech-path controlling device as claimed in claim 12, wherein said communication servicing device is a message storing device for registering voice sound transmitted from said mobile device.

* * * * *

UNITED STATES PATENT AND TRADEMARK OFFICE
CERTIFICATE OF CORRECTION

PATENT NO : 6,088,597
DATED : JULY 11, 2000
INVENTOR(S) : Teruhisa SATO, et al.

It is certified that error appears in the above-identified patent and that said Letters Patent are hereby corrected as shown below:

Please correct the name of the Assignee from FUJTISU LIMITED to FUJITSU LIMITED.

Signed and Sealed this

Eighth Day of May, 2001

Attest:

NICHOLAS P. GODICI

Attesting Officer

Acting Director of the United States Patent and Trademark Office